(12) United States Patent
Kol et al.

(10) Patent No.: US 10,868,451 B2
(45) Date of Patent: Dec. 15, 2020

(54) ELECTRIC MACHINE COMPRISING A ROTOR AND A STATOR

(71) Applicant: Robert Bosch GmbH, Stuttgart (DE)

(72) Inventors: Murat Kol, Stuttgart (DE); Patrick Heuser, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/336,457

(22) PCT Filed: Aug. 17, 2017

(86) PCT No.: PCT/EP2017/070867
§ 371 (c)(1),
(2) Date: Mar. 25, 2019

(87) PCT Pub. No.: WO2018/059828
PCT Pub. Date: Apr. 5, 2018

(65) Prior Publication Data
US 2019/0238014 A1  Aug. 1, 2019

(30) Foreign Application Priority Data

Sep. 27, 2016 (DE) .......... 10 2016 218 510
Feb. 22, 2017 (DE) .......... 10 2017 202 858
May 31, 2017 (DE) .......... 10 2017 209 207

(51) Int. Cl.
*H02K 1/27* (2006.01)
*H02K 29/03* (2006.01)

(52) U.S. Cl.
CPC ........... *H02K 1/276* (2013.01); *H02K 1/2766* (2013.01); *H02K 29/03* (2013.01); *H02K 2201/06* (2013.01); *H02K 2213/03* (2013.01)

(58) Field of Classification Search
CPC .. H02K 1/276; H02K 1/2766; H02K 2213/03; H02K 29/03; H02K 2201/06; H02K 1/27–1/2793
(Continued)

(56) References Cited

U.S. PATENT DOCUMENTS

| 8,994,240 B2 | 3/2015 | Matsuoka et al. |
| 2005/0200223 A1* | 9/2005 | Tajima .............. H02K 1/2766 |
| | | 310/156.46 |

(Continued)

FOREIGN PATENT DOCUMENTS

| CN | 102369650 A | 3/2012 |
| CN | 103280904 A | 9/2013 |

(Continued)

OTHER PUBLICATIONS

International Search Report for Application No. PCT/EP2017/070867 dated Nov. 10, 2017 (English Translation, 2 pages).

*Primary Examiner* — Thomas Truong
(74) *Attorney, Agent, or Firm* — Michael Best & Friedrich LLP

(57) ABSTRACT

The invention relates to an electric machine comprising a rotor (10) and a stator (20). The rotor (10) has magnet pockets for receiving permanent magnets (55, 56, 85, 86), and the magnet pockets comprise at least one first pair of magnet pockets (50, 51) and a second pair of magnet pockets (80, 11). The second pair (80, 81) is arranged further inwards than the first pair (50, 51) when viewed in a radial direction with respect to a rotational axis, and the magnet pockets of each pair of magnet pockets (50, 51, 80, 81) are arranged symmetrically to one another with respect to an axis of symmetry (45), wherein the axis of symmetry (45) runs in the radial direction and through the center of the rotor (10). The magnet pockets of each pair of magnet pockets (50, 51, 80, 81) are arranged such that the distance of each magnet (Continued)

pocket to the axis of symmetry (45) increases as the distance to the circumferential edge (110) of the rotor (10) decreases. The magnet pockets of the first pair (50, 51) are arranged at a first mechanical angle to one another, and the magnet pockets of the second pair (80, 81) are arranged at a second mechanical angle to one another. The invention is characterized in that the first angle ranges from ca. 100° to ca. 140°, in particular from ca. 120° to ca. 140°, and the second angle ranges from ca. 65° to ca. 112°, in particular from ca. 88° to ca. 112°.

17 Claims, 1 Drawing Sheet

(58) Field of Classification Search
USPC .................................. 310/156.01–156.84
See application file for complete search history.

(56) References Cited

U.S. PATENT DOCUMENTS

| | | | |
|---|---|---|---|
| 2010/0079026 A1* | 4/2010 | Han | H02K 1/2766 310/156.53 |
| 2013/0147299 A1* | 6/2013 | Rahman | H02K 1/2706 310/156.01 |
| 2014/0125183 A1 | 5/2014 | Takahashi | |
| 2016/0329845 A1* | 11/2016 | Jannot | H02P 6/182 |
| 2018/0241262 A1* | 8/2018 | Tang | H02K 1/2766 |

FOREIGN PATENT DOCUMENTS

| | | |
|---|---|---|
| CN | 103378699 A | 10/2013 |
| CN | 103475123 A | 12/2013 |
| CN | 104038011 A | 9/2014 |
| CN | 105958690 A | 9/2016 |
| EP | 2485370 | 8/2012 |
| JP | 2000102202 | 4/2000 |
| JP | 2000102202 A | 4/2000 |
| JP | 2006115584 A | 4/2006 |

* cited by examiner

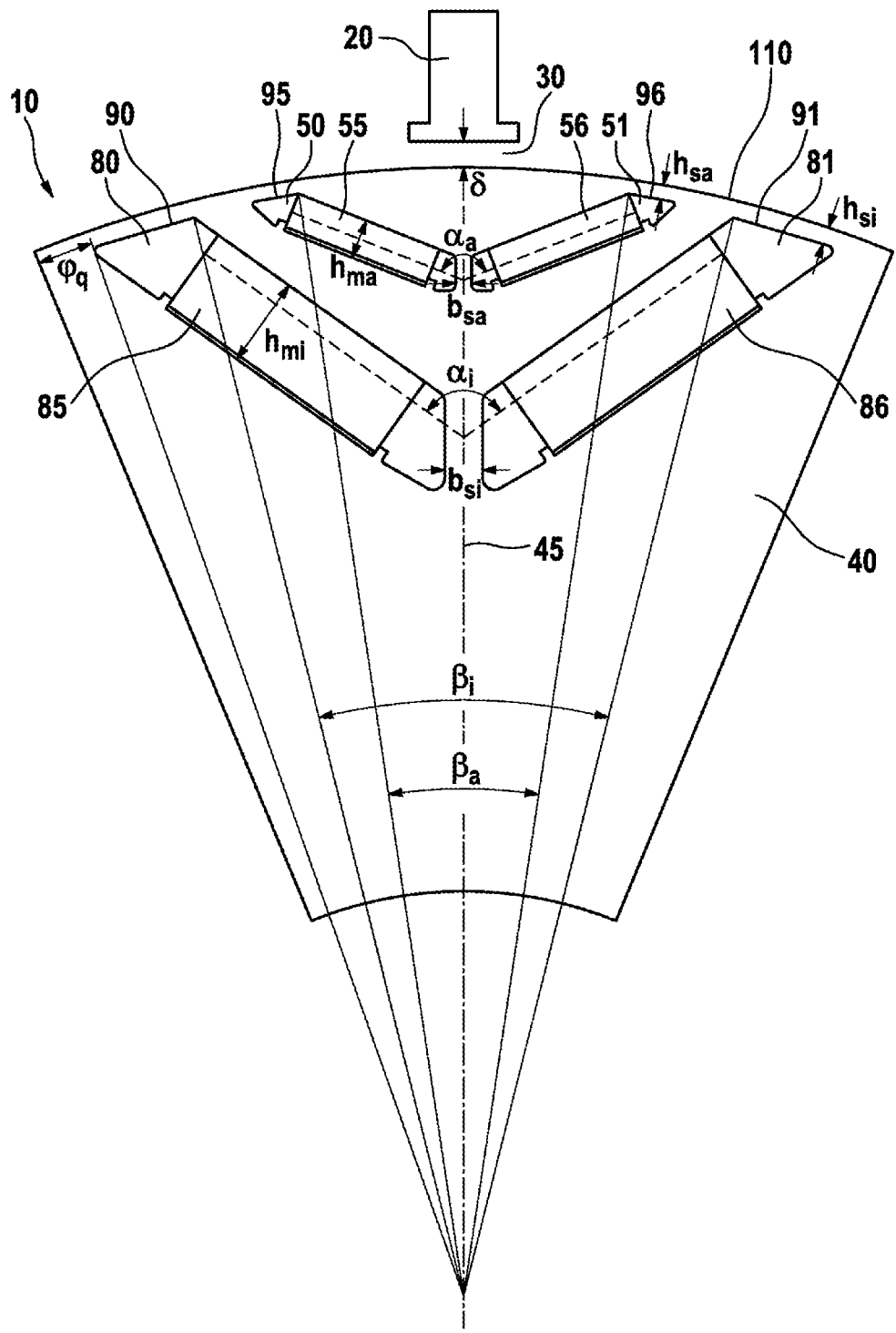

ELECTRIC MACHINE COMPRISING A ROTOR AND A STATOR

BACKGROUND OF THE INVENTION

The invention relates to an electric machine comprising a rotor and a stator.

A large number of electric machines having a rotor and a stator are known. It is in particular the magnetic rotor flux which is to be taken into account in electric machines. The aim is to achieve a high level of rotor flux.

U.S. Pat. No. 8,994,240 B describes an electric machine in which two pairs of magnet pockets for accommodating magnets are provided in a respectively V-shaped arrangement. The objective here is to achieve a maximum level of rotor flux.

The disadvantage here, however, is that such an electric machine usually has a high level of torque ripple. It is also the case with previously known electric machines that the increased level of rotor flux usually results in an increase in the losses. It is generally the case that high losses are generated in particular in the field-weakening range.

SUMMARY OF THE INVENTION

Embodiments of the present invention can advantageously provide for an electric machine which generates a high level of rotor flux and thus a high torque and a high performance level. At the same time, the electric machine has a low level of torque ripple and thus also gives rise to a low level of noise. In addition, the electric machine has low losses, a high speed performance and good demagnetization capability. It is also the case that the electric machine can be produced cost-effectively.

A first aspect of the invention proposes an electric machine comprising a rotor and a stator, wherein the rotor has magnet pockets for accommodating permanent magnets, wherein the magnet pockets comprise at least a first pair of magnet pockets and a second pair of magnet pockets, wherein the second pair is arranged radially further toward the inside than the first pair, as seen with respect to a rotor axis, wherein the magnet pockets of the respective pair of magnet pockets are arranged symmetrically in relation to one another, as seen with respect to an axis of symmetry, wherein the axis of symmetry runs in the radial direction and through the center point of the rotor, wherein the magnet pockets of the respective pair of magnet pockets are arranged such that a distance between the respective magnet pocket and the axis of symmetry increases as the distance to the circumferential periphery of the rotor decreases, wherein the magnet pockets of the first pair are arranged at a first mechanical angle in relation to one another, and wherein the magnet pockets of the second pair are arranged at a second mechanical angle in relation to one another, characterized in that the first angle ranges from approximately 100° to approximately 140°, in particular ranges from approximately 120° to approximately 140°, and the second angle ranges from approximately 65° to approximately 112°, in particular ranges from approximately 88° to approximately 112°.

Ideas relating to embodiments of the present invention can be considered, inter alia, to be based on the knowledge and concepts described hereinbelow.

Precise investigations of a computer-based "multi-objective optimization" have shown that the double-V arrangement of magnet pockets at certain angles results in a high level of rotor flux with a simultaneously low level of torque ripple and low losses.

According to one embodiment, the magnet pockets of the first pair are spaced apart from one another and the magnet pockets of the second pair are spaced apart from one another, wherein the smallest distance between the magnet pockets of the second pair is greater than the smallest distance between the magnet pockets of the first pair. One advantage of this is that it is usually the case that the speed performance can be increased.

According to one embodiment, the magnet pockets of the first pair are arranged in a circle-sector-form region between the magnet pockets of the second pair, wherein the two pairs of magnet pockets have the same axis of symmetry. The rotor flux is usually increased as a result.

According to one embodiment, the magnet pockets of the first pair are spaced apart from one another, wherein the smallest distance between the magnet pockets of the first pair has a width ranging from approximately 0.5 mm to approximately 1.5 mm, in particular ranging from approximately 0.5 mm to approximately 1.2 mm, wherein the magnet pockets of the second pair are spaced apart from one another, wherein the smallest distance between the magnet pockets of the second pair has a width ranging from approximately 2.0 mm to approximately 4.0 mm, in particular ranging from approximately 2.0 mm to approximately 3.0 mm. One advantage of this is that it is usually the case that it is possible to achieve an even higher level of rotor flux with low losses.

According to one embodiment, the smallest distance between the magnet pockets of the first pair and/or the second pair and the circumferential periphery of the rotor is approximately 0.5 mm to approximately 1.5 mm. As a result, it is usually the case that the rotor leakage flux is reduced and the torque-generating rotor flux is further increased.

According to one embodiment, the magnet pockets of the first pair and/or the magnet pockets of the second pair each have a peripheral region which is spaced apart from the circumferential periphery of the rotor by a distance which increases in the direction of the axis of symmetry. One advantage of this is usually an increase in the speed performance.

According to one embodiment, the magnet pockets of the first pair are arranged such that the electrical pole-pitch angle of the first pair of magnet pockets is approximately 59.5° to approximately 80.0°, in particular approximately 59.5° to approximately 72.0°. The advantage here is that the torque ripple is usually reduced.

According to one embodiment, the magnet pockets of the second pair are arranged such that the electrical pole-pitch angle of the second pair of magnet pockets is approximately 110.0° to approximately 122.0°, in particular approximately 110.0° to approximately 116.5°. The advantage here is that the torque ripple and the level of noise are usually reduced to a considerable extent.

According to one embodiment, the rotor has pole segments of similar construction along its circumferential direction, wherein the respectively directly adjacent pole segments are separated from one another by pole boundaries, wherein the magnet pockets of the second pair are each spaced apart from the respective directly adjacent pole boundaries by an electrical angle ranging from approximately 7.5° to approximately 35.0°, in particular ranging from approximately 7.5° to approximately 16.0°.

According to one embodiment, the air gap between the rotor and the stator is approximately 1.0 mm to approximately 2.0 mm, in particular approximately 1.0 mm to approximately 1.7 mm. As a result, it is usually the case that the flux is reduced slightly, but at the same time the losses also decrease to a disproportionately pronounced extent.

According to one embodiment, the height of the magnet pockets of the first pair differs from the height of the magnet pockets of the second pair, in particular the height of the magnet pockets of the first pair is smaller than the height of the magnet pockets of the second pair. One advantage of this is that it is usually the case that high demagnetization stability is achieved along with low costs.

It is pointed out that some of the possible features and advantages of the invention are described here with respect to different embodiments of an electric machine. A person skilled in the art will be aware that the features can be suitably combined, adapted or changed over so as to arrive at further embodiments of the invention.

BRIEF DESCRIPTION OF THE DRAWING

Embodiments of the invention will be described hereinbelow with reference to the attached drawing, wherein neither the drawing nor the description should be interpreted as being limiting to the invention.

FIG. 1 shows a schematic view of a region of one embodiment of the electric machine according to the invention.

The FIGURE is merely schematic and is not true to scale. Identical reference signs in the FIGURE denote identical or identically acting features.

DETAILED DESCRIPTION

FIG. 1 shows a schematic view of a region of one embodiment of the electric machine according to the invention. The electric machine comprises a rotor 10 and a stator 20. The electric machine can be, in particular, a permanently energized synchronous machine. The electric machine can be used in hybrid and electric vehicles.

An air gap 30 ($\delta$) is present between the rotor 10 and stator 20. The air gap 30 between the rotor 10 and the stator 20 is approximately 1.0 mm to approximately 2 mm, in particular approximately 1.0 mm to approximately 1.7 mm.

FIG. 1 illustrates a pole segment 40 of the rotor 10. The rotor 10 comprises a plurality of similarly or identically constructed pole segments 40 along its circumferential direction. The pole segment 40 has two pairs 50, 51, 80, 81 of magnet pockets. A first pair of magnet pockets 50, 51, i.e. two magnet pockets 50, 51 which belong to one another, are arranged further toward the outside in the radial direction of the rotor 10 (running from bottom to top in FIG. 1) than a second pair of magnet pockets 80, 81, i.e. two magnet pockets 80, 81 which belong to one another.

The magnet pockets 50, 51, 80, 81 are designed to accommodate permanent magnets 55, 56, 85, 86. In FIG. 1, permanent magnets 55, 56, 85, 86 are arranged in the magnet pockets 50, 51, 80, 81. A respective permanent magnet 55, 56, 85, 86 is arranged in each of the magnet pockets 50, 51, 80, 81. The permanent magnets 55, 56, 85, 86 are each smaller than the respective magnet pocket.

The magnet pockets 50, 51 of the first pair (illustrated at the top in the FIGURE) have a mechanical or geometrical angle $\alpha_a$ ranging from approximately 100° to approximately 140°, in particular ranging from approximately 120° to approximately 140°. This means that the longitudinal directions of the two magnet pockets 50, 51, the longitudinal direction being the direction of greatest extent of the respective magnet pocket 50, 51, enclose a mechanical or geometrical angle which ranges from approximately 100° to approximately 140°, in particular ranges from approximately 120° to approximately 140°.

A mechanical or geometrical angle $\alpha_i$ which ranges from approximately 65° to approximately 112°, in particular ranges from approximately 88° to approximately 112°, is present between the magnet pockets 80, 81 of the second pair (illustrated lower down in FIG. 1). There is therefore a mechanical or geometrical angle ranging from approximately 65° to approximately 112°, in particular ranging from approximately 88° to approximately 112°, enclosed between the two longitudinal directions of the two magnet pockets 80, 81 of the second pair, wherein the longitudinal direction runs in each case in the direction of the greatest extent of the magnet pocket 80, 81.

The magnet pockets 50, 51 of the first pair are arranged symmetrically in relation to an axis of symmetry 45 or plane of symmetry, wherein the axis of symmetry 45 or plane of symmetry runs in the radial direction of the rotor 10 and through the center point of the rotor 10. The axis of symmetry or plane of symmetry 45 runs through the center of the respective pole segment. In FIG. 1, the axis of symmetry 45 runs from top to bottom. The magnet pockets 80, 81 of the second pair are likewise arranged symmetrically in relation to the same axis of symmetry 45.

The distance between the respective magnet pocket 50, 51, 80, 81 and the axis of symmetry 45 increases as the distance to the circumferential periphery 110 of the rotor 10 decreases. The magnet pockets 50, 51, 80, 81 of the first pair and of the second pair are therefore each arranged in a V-shaped manner or in a form corresponding to the letter V, wherein the axis of symmetry 45 runs through the lowermost point or the dip of the letter V.

The magnet pockets 50, 51, 80, 81 each have a peripheral region 90, 91, 95, 96 which runs essentially parallel to the circumferential periphery 110. Since the peripheral region 90, 91, 95, 96 is a straight edge of the (trapezoidal) magnet pocket 50, 51, 80, 81, whereas the circumferential periphery 110 of the rotor 10 is a circle arc, parallelism is only approximate.

The distance $h_{sa}$ of the peripheral regions 90, 91 of the first pair 50, 51 is approximately 0.5 to approximately 1.5 mm. The distance $h_{si}$ of the peripheral regions 95, 96 of the second pair 80, 81 is approximately 0.5 to approximately 1.5 mm. The distances between the peripheral regions 90, 91, 95, 96 and the circumferential periphery 110 can increase or remain the same in each case in the direction of the axis of symmetry 45.

The magnet pockets of the first pair 50, 51 have a smallest distance $b_{sa}$ which ranges from approximately 0.5 to approximately 1.5 mm, in particular ranges from approximately 0.5 to approximately 1.2 mm. A crosspiece of the rotor 10 is therefore located between the magnet pockets 50, 51 of the first pair, said crosspiece having a constant width over its length (running from top to bottom in FIG. 1).

The magnet pockets 80, 81 of the second pair have a smallest distance $b_{si}$ which ranges from approximately 2.0 to approximately 4.0 mm, in particular ranges from approximately 2.0 to approximately 3.0 mm. A crosspiece of the rotor 10 is therefore located between the magnet pockets 80, 81 of the second pair, said crosspiece having a constant width over its length (running from top to bottom in the FIGURE).

The crosspiece between the magnet pockets 50, 51 of the first pair is smaller than the crosspiece between the magnet pockets 80, 81 of the second pair.

The respective pole segment 40 is separated by pole boundaries from the pole segments 40 which are directly adjacent in the circumferential direction. The magnet pockets 80, 81 of the second pair are spaced apart from the pole boundaries by a (smallest) electrical angle $\varphi_q$ of approximately 7.5° to approximately 35.0°, in particular of approximately 7.5° to approximately 16.0°.

The magnet pockets 50, 51 of the first pair have an electrical pole-pitch angle $\beta_a$ of approximately 59.5° to approximately 80.0°, in particular of approximately 59.5° to approximately 72.0°. The magnet pockets 80, 81 of the second pair have an electrical pole-pitch angle $\beta_i$ of approximately 110.0° to approximately 122.0°, in particular of approximately 110.0° to approximately 116.5°.

The electrical angle $\theta_{electrical}$ is calculated from the mechanical or geometrical angle $\theta_{mechanical}$, and vice-versa, as follows:

$$\theta_{electrical} = \theta_{mechanical} * (P/2)$$

where P is the number of poles of the rotor 10.

The pole-pitch angle is the electrical angle covered by the respective magnet pockets 50, 51, 80, 81 as seen from the center point of the rotor 10. The pole-pitch angle covers the electrical angle which extends from the center point of the rotor 10 to those points of the respective magnet pocket 50, 51, 80, 81 which are located in each case closest to the circumferential periphery 110 of the rotor 10 and closest to the axis of symmetry 45. The magnet pockets 50, 51, 80, 81 each have rounded corners at these locations or points.

The magnet pockets 50, 51, 80, 81 are each in the form of a trapezium. The short base side of the magnet pocket 50, 51, 80, 81 is directed in each case toward the circumferential periphery 110 of the rotor 10 and the long base side of the magnet pocket 50, 51, 80, 81 is directed away from the circumferential periphery 110 of the rotor 10. The point for determining the electrical pole-pitch angle is the point of contact or the corner between the short base side of the trapezium and that limb of the magnet pocket 50, 51, 80, 81 which is directed toward the circumferential periphery 110 of the rotor 10. The limb which is directed toward the circumferential periphery 110 of the rotor 10 forms in each case the peripheral region 90, 91, 95, 96 of the magnet pocket 50, 51, 80, 81.

Permanent magnets 55, 56, 85, 86 are arranged in the magnet pockets 50, 51, 80, 81. The magnet pockets 50, 51, 80, 81 each have a respective height $h_{mi}$ or $h_{ma}$ which extends perpendicularly to the longitudinal direction of the respective magnet pocket 50, 51, 80, 81, wherein the longitudinal directions of the magnet pockets 50, 51, 80, 81 of the first and second pairs respectively form the (mechanical or geometrical) angle $\alpha_a$ of approximately 100° to approximately 140° and the (mechanical or geometrical) angle $\alpha_i$ of approximately 65° to approximately 112°.

The heights of the permanent magnets 55, 56 in the magnet pockets 50, 51 of the first pair can be equal. The heights of the permanent magnets 85, 86 in the magnet pockets 80, 81 of the second pair can be equal. The heights of the magnet pockets 50, 51 of the first pair can be equal. The heights of the magnet pockets 80, 81 of the second pair can be equal.

The height or heights of the magnet pockets 50, 51 of the first pair can be smaller than the height or heights of the magnet pockets 80, 81 of the second pair. The height $h_{ma}$ of the first pair of magnet pockets 50, 51 can be approximately 2.0 mm to approximately 4.5 mm, in particular approximately 2.0 mm to approximately 4.5 mm. The height $h_{mi}$ of the second pair of magnet pockets 80, 81 can be approximately 4.0 mm to approximately 7.5 mm, in particular approximately 4.0 mm to approximately 6.5 mm.

The length of the permanent magnets 55, 56, 85, 86 is (considerably) smaller in each case than the length of the magnet pockets 50, 51, 80, 81 in the longitudinal direction.

The fixing points for the magnets can be arranged on the underside of the magnet pockets 50, 51, 80, 81, i.e. on that side of the respective magnet pocket 50, 51, 80, 81 which is directed toward the center of the rotor (or on that side of the same which is directed away from the circumferential periphery 110). As an alternative, or in addition, the fixing points or retaining noses of the permanent magnets 55, 56, 85, 86 can be arranged on the upper side of the magnet pockets 50, 51, 80, 81, i.e. on that side of the magnet pockets which is directed away from the center point of the rotor.

The two magnet pockets 80, 81 of the second pair form a circle sector, which is formed and delimited by the two longitudinal directions of the magnet pockets 80, 81. The first pair of magnet pockets 50, 51 is arranged in said circle sector of the second pair of magnet pockets 80, 81.

To conclude, it is pointed out that terms such as "having", "comprising", etc. do not rule out any other elements or steps and terms such as "a", "an" or "one" do not rule out a multiplicity. Reference signs in the claims should not be regarded as being limiting.

What is claimed is:

1. An electric machine comprising a rotor (10) and a stator (20),
   wherein the rotor (10) has magnet pockets for accommodating permanent magnets (55, 56, 85, 86),
   wherein the magnet pockets comprise at least a first pair of magnet pockets (50, 51) and a second pair of magnet pockets (80, 81), wherein the second pair (80, 81) is arranged radially further toward the inside than the first pair (50, 51), as seen with respect to a rotor axis,
   wherein the magnet pockets of each respective pair of magnet pockets (50, 51, 80, 81) are arranged symmetrically in relation to one another, as seen with respect to an axis of symmetry (45), wherein the axis of symmetry (45) runs in a radial direction and through a center point of the rotor (10),
   wherein the magnet pockets of each respective pair of magnet pockets (50, 51, 80, 81) are arranged such that a distance between the respective magnet pocket and the axis of symmetry (45) increases as a distance to a circumferential periphery (110) of the rotor (10) decreases,
   wherein the magnet pockets of the first pair (50, 51) are arranged at a first mechanical angle in relation to one another,
   wherein the magnet pockets of the second pair (80, 81) are arranged at a second mechanical angle in relation to one another,
   wherein the first angle ranges from approximately 100° to approximately 140°,
   wherein the second angle ranges from approximately 65° to approximately 112°, and
   wherein the magnet pockets of the first pair (50, 51) are arranged such that an electrical pole-pitch angle of the first pair of magnet pockets (50, 51) is approximately 59.5° to approximately 72.0°.

2. The electric machine as claimed in claim 1, wherein the magnet pockets of the first pair (50, 51) are spaced apart from one another and the magnet pockets of the second pair (80, 81) are spaced apart from one another, wherein a smallest distance between the magnet pockets of the second pair (80, 81) is greater than a smallest distance between the magnet pockets of the first pair (50, 51).

3. The electric machine as claimed in claim 1, wherein the magnet pockets of the first pair (50, 51) are arranged in a circle-sector-form region between the magnet pockets of the second pair (80, 81), wherein the first and second pairs of magnet pockets (50, 51, 80, 81) have the same axis of symmetry (45).

4. The electric machine as claimed in claim 1, wherein the magnet pockets of the first pair (50, 51) are spaced apart from one another, wherein a smallest distance between the magnet pockets of the first pair (50, 51) has a width of approximately 0.5 mm to approximately 1.5 mm, wherein the magnet pockets of the second pair (80, 81) are spaced apart from one another, wherein a smallest distance between the magnet pockets of the second pair (80, 81) has a width of approximately 2.0 mm to approximately 4.0 mm.

5. The electric machine as claimed in claim 1, wherein a smallest distance between the magnet pockets of the first pair (50, 51) and/or the second pair (80, 81) and a circumferential periphery (110) of the rotor (10) is approximately 0.5 mm to approximately 1.5 mm.

6. The electric machine as claimed in claim 1, wherein the magnet pockets of the first pair (50, 51) and/or the magnet pockets of the second pair (80, 81) each have a peripheral region (90, 91, 95, 96) which is spaced apart from a circumferential periphery (110) of the rotor (10) by a distance which tapers in a direction of the axis of symmetry (45).

7. The electric machine as claimed in claim 1, wherein the rotor (10) has pole segments (40) of similar construction along a circumferential direction, wherein respectively directly adjacent pole segments (40) are separated from one another by pole boundaries, wherein the magnet pockets of the second pair (80, 81) are each spaced apart from the respective directly adjacent pole boundaries by an electrical angle of approximately 7.5° to approximately 35.0°.

8. The electric machine as claimed in claim 1, wherein an air gap (30) between the rotor (10) and the stator (20) is approximately 1.0 mm to approximately 2.0 mm.

9. The electric machine as claimed in claim 1, wherein a height of the magnet pockets of the first pair (50, 51) differs from a height of the magnet pockets of the second pair (80, 81).

10. The electric machine as claimed in claim 1, wherein the first angle ranges from approximately 120° to approximately 140°, and wherein the second angle ranges from approximately 88° to approximately 112°.

11. The electric machine as claimed in claim 1, wherein the magnet pockets of the first pair (50, 51) are spaced apart from one another, wherein a smallest distance between the magnet pockets of the first pair (50, 51) has a width of approximately 0.5 mm to approximately 1.2 mm, wherein the magnet pockets of the second pair (80, 81) are spaced apart from one another, wherein a smallest distance between the magnet pockets of the second pair (80, 81) has a width of approximately 2.0 mm to approximately 3.0 mm.

12. The electric machine as claimed in claim 1, wherein the magnet pockets of the second pair (80, 81) are arranged such that an electrical pole-pitch angle of the second pair (80, 81) of magnet pockets is approximately 110.0° to approximately 122.0°.

13. The electric machine as claimed in claim 1, wherein the magnet pockets of the second pair (80, 81) are arranged such that an electrical pole-pitch angle of the second pair (80, 81) of magnet pockets is approximately 110.0° to approximately 116.7°.

14. The electric machine as claimed in claim 1, wherein the magnet pockets of the second pair (80, 81) are arranged such that an electrical pole-pitch angle of the second pair (80, 81) of magnet pockets is 110.0° to approximately 116.5°.

15. The electric machine as claimed in claim 1, wherein the rotor (10) has pole segments (40) of similar construction along a circumferential direction, wherein respectively directly adjacent pole segments (40) are separated from one another by pole boundaries, wherein the magnet pockets of the second pair (80, 81) are each spaced apart from the respective directly adjacent pole boundaries by an electrical angle of approximately 7.5° to approximately 16.0°.

16. The electric machine as claimed in claim 1, wherein an air gap (30) between the rotor (10) and the stator (20) is approximately 1.0 mm to approximately 1.7 mm.

17. The electric machine as claimed in claim 1, wherein a height of the magnet pockets of the first pair (50, 51) is smaller than a height of the magnet pockets of the second pair (80, 81).

\* \* \* \* \*